US012281663B2

(12) United States Patent
Shimada et al.

(10) Patent No.: US 12,281,663 B2
(45) Date of Patent: Apr. 22, 2025

(54) FLUID CIRCUIT

(71) Applicant: EAGLE INDUSTRY CO., LTD., Tokyo (JP)

(72) Inventors: Yoshiyuki Shimada, Tokyo (JP); Koji Sato, Tokyo (JP); Yuta Okamoto, Tokyo (JP); Tomoki Seki, Tokyo (JP); Tatsuhiro Arikawa, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/284,520

(22) PCT Filed: Mar. 17, 2022

(86) PCT No.: PCT/JP2022/012346

§ 371 (c)(1),
(2) Date: Sep. 27, 2023

(87) PCT Pub. No.: WO2022/209969

PCT Pub. Date: Oct. 6, 2022

(65) Prior Publication Data

US 2024/0159255 A1 May 16, 2024

(30) Foreign Application Priority Data

Mar. 31, 2021 (JP) ................................ 2021-059974

(51) Int. Cl.

| | |
|---|---|
| ***F15B 3/00*** | (2006.01) |
| ***F04B 9/109*** | (2006.01) |
| ***F15B 9/08*** | (2006.01) |

(52) U.S. Cl.

CPC ................ *F15B 3/00* (2013.01); *F04B 9/109* (2013.01); *F15B 9/08* (2013.01);

(Continued)

(58) Field of Classification Search

CPC .... F15B 9/08; F15B 9/10; F15B 11/10; F15B 11/15; F15B 3/00; F04B 9/109; F01L 23/00

See application file for complete search history.

(56) References Cited

U.S. PATENT DOCUMENTS

| | | | | |
|---|---|---|---|---|
| 3,811,795 A * | 5/1974 | Olsen | F03C 1/10 | 417/397 |
| 5,007,544 A | 4/1991 | Saotome | B66C 13/18 | |

(Continued)

FOREIGN PATENT DOCUMENTS

| | | | |
|---|---|---|---|
| EP | 0439621 | 8/1990 | F15B 11/01 |
| GB | 2275969 | 9/1994 | F15B 3/00 |

(Continued)

OTHER PUBLICATIONS

International Search Report and Written Opinion, and International Preliminary Report on Patentability issued in PCT/JP2022/034388, dated Nov. 22, 2022, 24 pages.

(Continued)

*Primary Examiner* — Michael Leslie
(74) *Attorney, Agent, or Firm* — HAYES SOLOWAY P.C.

(57) ABSTRACT

A first switching valve that switches between flow passages which allow communication between a first pressure-receiving chamber and a fluid supply device side and flow passages which allow communication between a second pressure-receiving chamber and the fluid supply device side, according to a change in a fluid pressure to be applied, and a second switching valve that is switched to flow passages which apply the fluid pressure to the first switching valve, are provided. The second switching valve includes return device, and is provided to be reciprocatable between an operation position to which the second switching valve is moved by a stroke of a piston and a return position to which (Continued)

the second switching valve is moved by the return device. The piston and the second switching valve are movable independently of each other.

15 Claims, 6 Drawing Sheets

(52) U.S. Cl.
CPC ............... *F15B 2211/20538* (2013.01); *F15B 2211/40515* (2013.01); *F15B 2211/4159* (2013.01); *F15B 2211/7716* (2013.01)

(56) References Cited

U.S. PATENT DOCUMENTS

| | | | | |
|---|---|---|---|---|
| 5,706,657 | A | 1/1998 | Ambroski | E02F 9/2207 |
| 6,526,747 | B2 | 3/2003 | Nakatani | F15B 11/165 |
| 9,051,944 | B2 | 6/2015 | Wen | F15B 21/14 |
| 9,279,236 | B2 | 3/2016 | Zhang | E02F 9/2217 |
| 10,288,094 | B2 | 5/2019 | Spielvogel | E02F 9/2232 |
| 2009/0317267 | A1 | 12/2009 | Gill et al. | F04B 49/06 |
| 2020/0032485 | A1 | 1/2020 | Hijikata et al. | E02F 9/22 |
| 2024/0159252 | A1* | 5/2024 | Shimada | F15B 1/04 |

FOREIGN PATENT DOCUMENTS

| | | | |
|---|---|---|---|
| JP | 58102804 | 6/1983 | F15B 11/02 |
| JP | 58191388 | 12/1983 | F04B 31/00 |
| JP | 374605 | 3/1991 | F15B 11/00 |
| JP | H04120324 | 4/1992 | E02F 9/22 |
| JP | H04366001 | 12/1992 | F15B 3/00 |
| JP | H0777205 | 3/1995 | E02F 3/36 |
| JP | 10175459 | 6/1998 | B60K 25/00 |
| JP | 2000329103 | 11/2000 | F15B 7/02 |
| JP | 2003013904 | 1/2003 | F04B 9/105 |
| JP | 2008185182 | 8/2008 | F15B 21/14 |
| JP | 2008190694 | 8/2008 | F15B 11/00 |
| JP | 2011185417 | 9/2011 | F16H 61/00 |
| JP | 2014013062 | 1/2014 | F15B 11/028 |
| JP | 20168695 | 1/2016 | F15B 11/02 |
| JP | 2018204772 | 12/2018 | F15B 11/02 |
| JP | 2019049321 | 3/2019 | F15B 21/14 |
| WO | WO2016169943 | 10/2016 | E02F 9/2217 |

OTHER PUBLICATIONS

International Search Report and Written Opinion, and International Preliminary Report on Patentability issued in PCT/JP2022/012344, dated May 31, 2022, 20 pages.

International Search Report and Written Opinion, and International Preliminary Report on Patentability issued in PCT/JP2022/012345, dated May 17, 2022, 24 pages.

International Search Report and Written Opinion, and International Preliminary Report on Patentability issued in PCT/JP2022/012346, dated May 31, 2022, 24 pages.

Official Action issued in related U.S. Appl. No. 18/284,248, dated Jul. 3, 2024, 13 pages.

Parker Hannifin catalog “Hydraulic Cartridge Systems”, HY15-3502/US, excerpt of pp. CV1-CV2 (Year 2010).

* cited by examiner

FLUID CIRCUIT

TECHNICAL FIELD

The present invention relates to a fluid circuit including a pressure-increasing device that increases a pressure of a working fluid.

BACKGROUND ART

In various fields, there is known a fluid circuit that drives an actuator using a working fluid such as working oil delivered from a fluid supply device such as a pump. Such a fluid circuit includes a pressure-increasing device capable of delivering the working fluid that is increased in pressure, and the actuator is actuated by the working fluid of the pressure-increasing device, or the working fluid is accumulated in an accumulator.

For example, a fluid circuit disclosed in Patent Citation 1 mainly includes a pump, a tank, a pressure-increasing device, and an accumulator. The pressure-increasing device includes a cylinder, a piston, and biasing means. The cylinder has a T-shaped hollow structure when viewed from the front. The piston has a T shape when viewed from the front, and is provided inside the cylinder so as to be reciprocatable in an axial direction. The biasing means biases the piston toward one axial side.

A space inside the cylinder is partitioned into a back pressure chamber as a pressure-receiving chamber and a pressure-increasing chamber as a pressure-receiving chamber by the piston. A pressure-receiving area of an end surface of the piston facing the back pressure chamber is larger than a pressure-receiving area of an end surface of the piston facing the pressure-increasing chamber. A flow passage communicating with the pump and a flow passage communicating with the tank are connected to the back pressure chamber. Switching between the flow passages communicating with the back pressure chamber is performed by switching the switching valve. A flow passage communicating with a tank side and a flow passage communicating with an accumulator side are connected to the pressure-increasing chamber.

Accordingly, in a state where the working fluid is stored in the pressure-increasing chamber, when the working fluid is delivered from the pump to the back pressure chamber, the piston moves to the other axial side. Then, the pressure-increasing device delivers the working fluid, which is compressed in the pressure-increasing chamber to be increased in pressure, to the accumulator side. In addition, a valve position of the switching valve is switched to allow communication between the back pressure chamber and the tank, and to start to discharge the hydraulic oil in the back pressure chamber to the tank, so that the pressure in the back pressure chamber gradually decreases. Then, when a biasing force of the biasing means is larger than a force to move the piston to the other axial side, the piston is moved to the one axial side, and the working fluid is suctioned to the pressure-increasing chamber from the tank.

CITATION LIST

Patent Literature

Patent Citation 1: JP 2011-185417 A (PAGE 7 and FIG. 1)

SUMMARY OF INVENTION

Technical Problem

In the pressure-increasing device as disclosed in Patent Citation 1, the valve position of the switching valve is switched according to the reciprocation of the piston, so that the working fluid which is increased in pressure can be continuously delivered to the accumulator. However, an electromagnetic switching valve that can be switched by an electric signal is generally used as such a switching valve. Therefore, the pressure-increasing device as disclosed in Patent Citation 1 requires a device that outputs an electric signal, a device that detects a valve position, and the like. Accordingly, the entirety of such a pressure-increasing device is increased in size, which is a problem. In addition, a control program for such a pressure-increasing device also becomes complicated, and there is also a cost issue.

The present invention is conceived in view of such problems, and an object of the present invention is to provide a fluid circuit capable of continuously driving a pressure-increasing device with a simple configuration.

Solution to Problem

In order to solve the foregoing problems, according to the present invention, there is provided a fluid circuit including: a fluid supply device that delivers a working fluid; and a pressure-increasing device that increases a pressure of the working fluid, wherein the pressure-increasing device includes a cylinder and a piston provided inside the cylinder so as to be reciprocatable in an axial direction, and delivers the working fluid that is increased in pressure, from the cylinder by pressing the piston inside the cylinder with the working fluid delivered from the fluid supply device, the cylinder includes a first pressure-receiving chamber that applies the working fluid delivered from the fluid supply device, to the piston toward a first axial side, and a second pressure-receiving chamber that applies the working fluid delivered from the fluid supply device, to the piston toward a second axial side opposed to the first axial side, a first switching valve that switches between a flow passage which allows communication between the first pressure-receiving chamber and a side of the fluid supply device and a flow passage which allows communication between the second pressure-receiving chamber and on the side of the fluid supply device, according to a change in a fluid pressure to be applied, and a second switching valve that is switched to a flow passage which applies the fluid pressure to the first switching valve, are provided, the second switching valve includes a return device, and is provided to reciprocatable between an operation position to which the second switching valve is moved by a stroke of the piston and a return position to which the second switching valve is moved by the return device, and the piston and the second switching valve are movable independently of each other. According to the foregoing feature of the present invention, the piston is reciprocatable by switching between delivering the working fluid delivered from the fluid supply device, into the first pressure-receiving chamber and delivering the working fluid into second pressure-receiving chamber via the first switching valve and via the second switching valve. Namely, the pressure-increasing device can be continuously driven using the fluid pressure from the fluid supply device. Further, the stroke of the piston can be increased by a distance that the piston and the second switching valve move independently of each other.

It may be preferable that the piston is strokable in a state where the piston is separated from the second switching valve by a predetermined dimension, the second switching valve being located at the return position. According to this preferable configuration, at least the piston can be stroked by the predetermined dimension.

It may be preferable that a first pressure-increasing chamber that is increased in pressure when the working fluid is delivered into the first pressure-receiving chamber from the fluid supply device, and a second pressure-increasing chamber that is increased in pressure when the working fluid is delivered into the second pressure-receiving chamber from the fluid supply device, are provided. According to this preferable configuration, the piston and the second switching valve are movable independently of each other. For this reason, it is possible to provide a double acting type pressure-increasing device that can be simply configured and that has high pressure-increasing efficiency.

It may be preferable that the second pressure-receiving chamber is a pressure-increasing chamber that is increased in pressure when the working fluid is delivered from the fluid supply device to the first pressure-receiving chamber. According to this preferable configuration, the piston and the second switching valve move independently of each other. For this reason, it is possible to provide a single acting type pressure-increasing device that can be simply configured and that has high pressure-increasing efficiency.

It may be preferable that the piston includes a rod that is separable from the second switching valve. According to this preferable configuration, the configuration for transmitting a movement of the piston to the second switching valve can be simplified.

It may be preferable that a throttle portion that restricts a flow of the working fluid from the first switching valve to the second switching valve is provided in a flow passage between the first switching valve and the second switching valve. According to this preferable configuration, the piston can be stably stroked by a maximum distance.

It may be preferable that the return device is a return spring. According to this preferable configuration, it is possible not only to simply configure the second switching valve but also to reduce the size by employing a spring with a small spring constant.

DESCRIPTION OF EMBODIMENTS

Modes for implementing a fluid circuit according to the present invention will be described below based on embodiments.

First Embodiment

A fluid circuit according to a first embodiment of the present invention will be described with reference to FIGS. 1 to 5.

Figure 1:
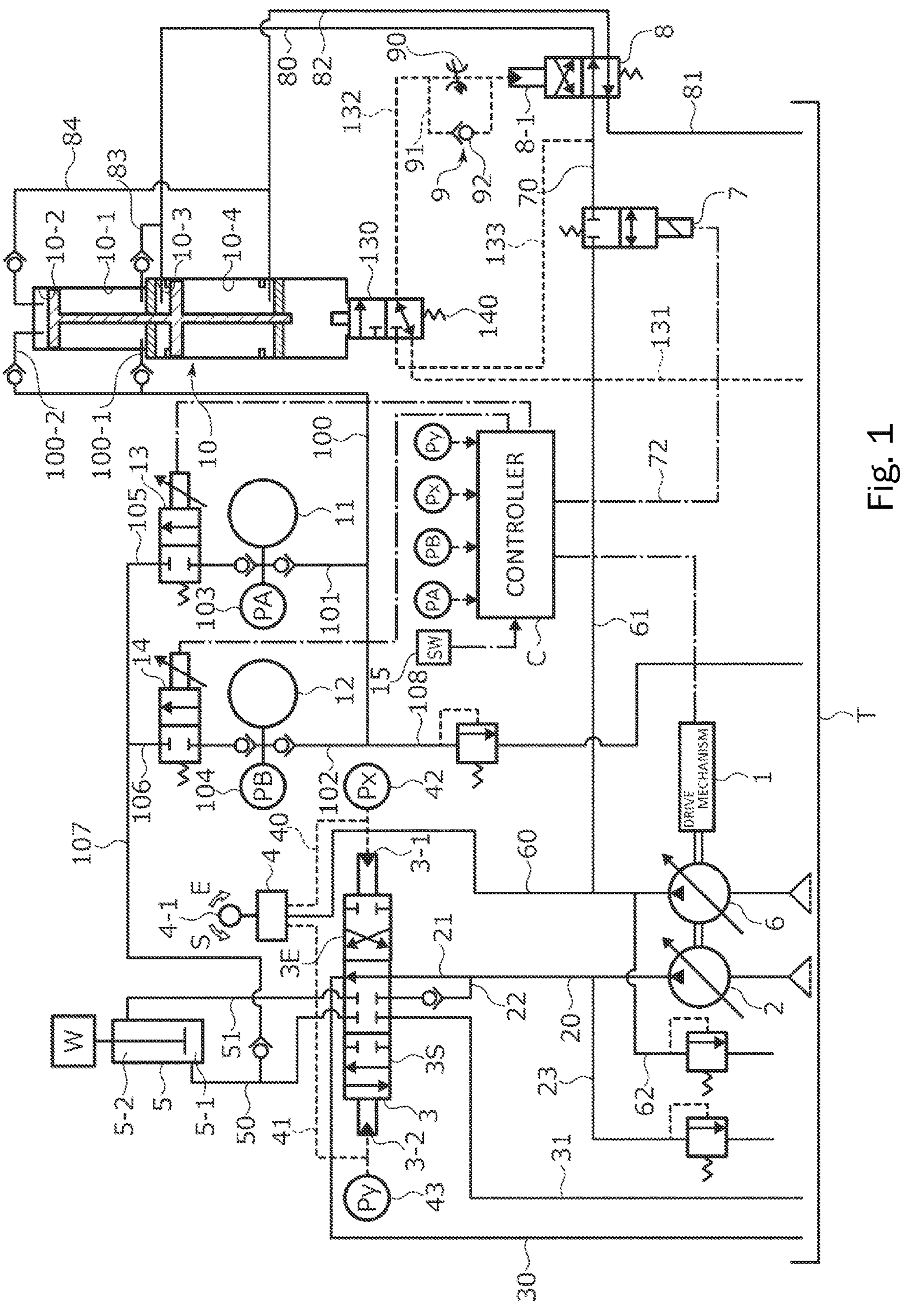
FIG. 1 is a schematic diagram illustrating a fluid circuit including a pressure-increasing device, according to a first embodiment of the present invention.

As illustrated in FIG. 1, the fluid circuit can be applied to, for example, hydraulic devices such as an actuator, a brake, a steering wheel, and a transmission in normal passenger cars or work vehicles such as a truck, a hydraulic excavator, a forklift, a crane, and a garbage truck. Incidentally, the hydraulic circuit illustrated in FIG. 1 is one example of the fluid circuit of the present invention, and is not limited to a configuration of FIG. 1.

The fluid circuit of the present embodiment is generally configured to move a workpiece W by actuating a cylinder 5 as an actuator using hydraulic pressure.

The fluid circuit mainly includes a main circuit hydraulic pump 2, a switching valve 3, a hydraulic remote control valve 4, the cylinder 5, a pilot circuit hydraulic pump 6 as a fluid supply device, an electromagnetic switching valve 7, a first switching valve 8, an adjustable slow return valve 9 as a throttle portion, a pressure-increasing device 10, accumulators 11 and 12, electromagnetic proportional switching valves 13 and 14, a controller C, and each oil passage as a flow passage.

First, a configuration of a main circuit side on which the cylinder 5 is actuated by the main circuit hydraulic pump 2 (hereinafter, simply referred to as the hydraulic pump 2) will be described. The hydraulic pump 2 and the pilot circuit hydraulic pump 6 are connected to a drive mechanism 1 such as an engine of a vehicle. Accordingly, the hydraulic pump 2 and the pilot circuit hydraulic pump 6 driven by power from the drive mechanism 1 deliver hydraulic oil to oil passages 20 and 60.

The hydraulic oil delivered from the hydraulic pump 2 flows into the switching valve 3 through an oil passage 21 that is branched and connected to the oil passage 20.

The switching valve 3 is a six-port and three-position type open center switching valve. The switching valve 3 at a neutral position connects the oil passage 21 to a tank-side oil passage 30 and to a tank T. For this reason, the entire amount of the hydraulic oil delivered from the hydraulic pump 2 is discharged to the tank T.

In addition, the switching valve 3 at an extension position 3E connects an oil passage 22 to a head-side oil passage 50 of the cylinder 5 (hereinafter, simply referred to as the head-side oil passage 50). At the same time, the switching valve 3 connects a rod-side oil passage 51 of the cylinder 5 (hereinafter, simply referred to as the rod-side oil passage 51) to a tank-side oil passage 31 and to the tank T. The oil passage 22 includes a check valve that is branched and connected to the oil passage 20.

In addition, the switching valve 3 at a contraction position 3S connects the oil passage 22 to the rod-side oil passage 51. At the same time, the switching valve 3 connects the head-side oil passage 50 to the tank-side oil passage 31 and to the tank T.

On the other hand, the hydraulic oil delivered from the pilot circuit hydraulic pump 6 is supplied to the hydraulic remote control valve 4 through the oil passage 60. Incidentally, the hydraulic oil supplied to the hydraulic remote control valve 4 is not limited to the hydraulic oil delivered from the pilot hydraulic pump, and may be a working fluid delivered from the hydraulic pump 2 and from the cylinder 5, or may be changed as appropriate.

The hydraulic remote control valve 4 is a variable pressure reduction valve. The hydraulic remote control valve 4 reduces the hydraulic oil of a pilot primary pressure to a pilot secondary pressure according to an operation amount of an operation lever 4-1. The hydraulic oil of the pilot primary pressure referred to here is the hydraulic oil delivered from the pilot circuit hydraulic pump 6. The hydraulic oil of the pilot secondary pressure acts on signal ports 3-1 and 3-2 of the switching valve 3 through pilot signal oil passages 40 and 41.

Incidentally, some of the hydraulic oil delivered from the pilot circuit hydraulic pump 6 may become extra oil that is not supplied from the hydraulic remote control valve 4 to the signal ports 3-1 and 3-2. Some of the extra oil flows into a pressure-increasing device 10 side to be described later through the oil passage 61, as working oil. On the other hand, all the extra oil other than the working oil is discharged to the tank T through a relief oil passage 62 including a relief valve.

Operation of the cylinder 5 according to operation of the hydraulic remote control valve 4 will be described. The switching valve 3 is switched to the extension position 3E by operating the operation lever 4-1 in an extension direction E. Then, the hydraulic oil delivered from the hydraulic pump 2 flows into a head chamber 5-1 of the cylinder 5 through the head-side oil passage 50 connected to the oil passages 20 and 22. At the same time, the hydraulic oil that has flowed out from a rod chamber 5-2 is discharged to the tank T through the tank-side oil passage 31 connected to the rod-side oil passage 51. At this time, an electric signal from a pressure sensor 42 installed on the pilot signal oil passage 40 is input to the controller C.

In addition, the switching valve 3 is switched to the contraction position 3S by operating the operation lever 4-1 in a contraction direction S. Then, the hydraulic oil delivered from the hydraulic pump 2 flows into the rod chamber 5-2 of the cylinder 5 through the rod-side oil passage 51 connected to the oil passages 20 and 22. At the same time, the hydraulic oil that has flowed out from the head chamber 5-1 is discharged to the tank T through the tank-side oil passage 31 connected to the head-side oil passage 50. At this time, an electric signal output from a pressure sensor 43 installed on the pilot signal oil passage 41 is input to the controller C.

In addition, a relief oil passage 23 including a relief valve is branched and connected to the oil passage 20. When the pressure in the oil passage 20 becomes abnormally high, the relief valve is released. Accordingly, the hydraulic oil is discharged from the relief oil passage 23 to the tank T.

Next, a configuration of a pilot circuit side that includes the pressure-increasing device 10 and that is connected to the pilot circuit hydraulic pump 6 will be described. Incidentally, the oil passage 60, the hydraulic remote control valve 4, the pilot signal oil passages 40 and 41, and the relief oil passage 62 described above are included in the configuration of the pilot circuit side.

The electromagnetic switching valve 7 is provided in the oil passage 61 that is branched and connected to the oil passage 60. When a switch 15 is in an OFF state, the electromagnetic switching valve 7 disconnects the oil passage 61 and an oil passage 70.

In addition, an electric signal input from the controller C when the switch 15 is set to an ON state is input to the electromagnetic switching valve 7 through an electric signal line 72. Accordingly, the electromagnetic switching valve 7 connects the oil passage 61 and the oil passage 70 (refer to FIG. 3).

The first switching valve 8 is provided in the oil passage 70. The first switching valve 8 is a switching valve that is switched to oil passages to be connected, according to pressure acting on a port 8-1. When the pressure acting on the port 8-1 is less than a predetermined value, the first switching valve 8 connects the oil passage 70 and an oil passage 80. At the same time, the first switching valve 8 connects an oil passage 81 and an oil passage 82. The oil passage 80 is connected to a first back pressure chamber 10-3 of the pressure-increasing device 10 to be described later. The oil passage 81 is connected to the tank T. The oil passage 82 is connected to a second back pressure chamber 10-4 of the pressure-increasing device 10.

In addition, when the pressure acting on the port 8-1 is the predetermined value or more, the first switching valve 8 connects the oil passage 70 and the oil passage 82. At the same time, the first switching valve 8 connects the oil passage 81 and the oil passage 80 (refer to FIG. 4B).

The pressure-increasing device 10 is connected to the oil passages 80 and 82. The pressure-increasing device 10 further increases a pressure of the hydraulic oil delivered from the pilot circuit hydraulic pump 6, and delivers the hydraulic oil to an oil passage 100. A configuration of the pressure-increasing device 10 will be described later.

An oil passage 100-1 and an oil passage 100-2 are branched and connected to an upstream side of the oil passage 100.

The oil passage 100-1 is connected to a first pressure-increasing chamber 10-1 of the pressure-increasing device 10 to be described later. In addition, a check valve is provided in the oil passage 100-1. The oil passage 100-2 is connected to a second pressure-increasing chamber 10-2 of the pressure-increasing device 10 to be described later. In addition, a check valve separate from that of the oil passage 100-1 is provided in the oil passage 100-2.

An oil passage 101 and an oil passage 102 are branched and connected to a downstream side of the oil passage 100. The oil passage 101 includes two check valves. The oil passage 102 includes two check valves separate from those of the oil passage 101.

The accumulator 11 and a pressure sensor 103 are connected to each other between the two check valves in the oil passage 101. The pressure sensor 103 detects a pressure of the accumulator 11. In addition, the electromagnetic proportional switching valve 13 is connected to a downstream side of the two check valves in the oil passage 101.

The accumulator 12 and a pressure sensor 104 are connected to each other between the two check valves in the oil passage 102. The pressure sensor 104 detects a pressure of the accumulator 12. In addition, the electromagnetic proportional switching valve 14 is connected to a downstream side of the two check valves in the oil passage 102.

The electromagnetic proportional switching valves 13 and 14 are a normally closed type. The electromagnetic proportional switching valves 13 and 14 are connected to the controller C through electric signal lines.

The controller C controls the electromagnetic proportional switching valves 13 and 14 to a closed state or an open state based on the electric signals input from the pressure sensors 42, 43, 103, and 104. Hereinafter, the electromagnetic proportional switching valve 13 will be described as an example.

When the pressure in the accumulator 11 decreases, an electric signal is input from the controller C, and the electromagnetic proportional switching valve 13 is set to a closed state. Accordingly, the accumulator 11 can accumulate the hydraulic oil in a pressure increased state delivered from the pressure-increasing device 10.

In addition, when the pressure in the accumulator 11 increases, an electric signal is input from the controller C to the electromagnetic proportional switching valve 13. Then, the electromagnetic proportional switching valve 13 connects the oil passages 101 and 105 at an opening degree according to the input signal. Accordingly, the accumulated hydraulic oil delivered from the accumulator 11 is recovered to the head chamber 5-1 of the cylinder 5 through an oil passage 107 including a check valve and through the head-side oil passage 50.

In addition, the switching of the electromagnetic proportional switching valves 13 and 14 is alternately performed by the controller C, so that the fluid circuit accumulates the hydraulic oil in one of the accumulators 11 and 12. At the same time, the fluid circuit can recover the hydraulic oil in a pressure increased state accumulated in the other accumulator, to a main circuit.

In addition, when the accumulated hydraulic oil in the accumulators 11 and 12 has reached an allowable amount, extra oil is generated in the oil passage 100. A relief oil passage 108 including a relief valve is branched and connected to the oil passage 100. The extra oil is discharged to the tank T through the relief oil passage 108.

Next, the pressure-increasing device 10 will be described. Incidentally, in this description, a return spring 140 side and an opposite side will be described as one axial side (namely, a lower side in the drawings) and the other axial side (namely, an upper side in the drawings), respectively.

As illustrated in FIG. 2, the pressure-increasing device 10 mainly includes a casing 110 as a cylinder, a piston 120, and a second switching valve 130. The piston 120 is provided to be movable inside the casing 110 in an axial direction. Incidentally, in FIGS. 1 to 5, the second switching valve 130 is illustrated in an enlarged manner to show switching of the oil passages.

The casing 110 is formed in a stepped cylindrical shape, and includes a large-diameter cylindrical portion 111 and a small-diameter cylindrical portion 112.

A first partition plate 113 having a disk shape is fixed to an upper axial side of the large-diameter cylindrical portion 111, namely, a boundary portion between the large-diameter cylindrical portion 111 and the small-diameter cylindrical portion 112. In addition, a second partition plate 114 having a disk shape is fixed to an axial center of the large-diameter cylindrical portion 111. The second partition plate 114 partitions the large-diameter cylindrical portion 111 into upper and lower portions.

In addition, the oil passage 80 is connected to a peripheral wall of the large-diameter cylindrical portion 111 between the first partition plate 113 and a spacer directly below the first partition plate 113. In addition, the oil passage 82 is connected to the peripheral wall of the large-diameter cylindrical portion 111 between the second partition plate 114 and a spacer directly above the second partition plate 114.

The small-diameter cylindrical portion 112 is formed in a bottomed cylindrical shape. An oil passage 83 is connected to a lower axial end portion of a peripheral wall of the small-diameter cylindrical portion 112. The oil passage 83 is branched and connected to the oil passage 80. In addition, the oil passage 100-1 is connected to the lower axial end portion of the peripheral wall of the small-diameter cylindrical portion 112. An oil passage 84 is connected to an upper axial end portion of the small-diameter cylindrical portion 112, namely, a top portion. The oil passage 84 is branched and connected to the oil passage 82. In addition, the oil passage 100-2 is connected to the top portion of the small-diameter cylindrical portion 112.

The piston 120 includes a rod 123, a large-diameter portion 121, and a small-diameter portion 122. The rod 123 extends in the axial direction. The large-diameter portion 121 is fixed to a middle portion of the rod 123. The small-diameter portion 122 is separated from the large-diameter portion 121 in the axial direction, and is fixed to an upper end portion of the rod 123.

The large-diameter portion 121 is formed such that an outer peripheral surface of the large-diameter portion 121 is slidable along an inner peripheral surface of the large-diameter cylindrical portion 111 of the casing 110. The small-diameter portion 122 is formed such that an outer peripheral surface of the small-diameter portion 122 is slidable along an inner peripheral surface of the small-diameter cylindrical portion 112 of the casing 110. The rod 123 is formed such that an outer peripheral surface of the rod 123 is slidable against inner peripheral surfaces of the partition plates 113 and 114.

Accordingly, in the casing 110 in which the piston 120 is stored, a space inside the small-diameter cylindrical portion 112, which is partitioned off from the large-diameter cylindrical portion 111 by the partition plate 113, is partitioned into the first pressure-increasing chamber 10-1 and the second pressure-increasing chamber 10-2 in a sealed manner by the small-diameter portion 122 of the piston 120. The oil passages 83 and 100-1 communicate with the first pressure-increasing chamber 10-1. The oil passages 84 and 100-2 communicate with the second pressure-increasing chamber 10-2.

In addition, in the casing 110 in which the piston 120 is stored, a space between the partition plate 113 and the partition plate 114 inside the large-diameter cylindrical portion 111 is partitioned into the first back pressure chamber 10-3 and the second back pressure chamber 10-4 in a sealed manner by the large-diameter portion 121 of the piston 120. The oil passage 80 communicates with the first back pressure chamber 10-3. The oil passage 82 communicates with the second back pressure chamber 10-4. Incidentally, in the present embodiment, the first back pressure chamber 10-3 is a first pressure-receiving chamber. In addition, in the present embodiment, the second back pressure chamber 10-4 is a second pressure-receiving chamber.

A lower end portion of the rod 123 of the piston 120 extends downward from the second partition plate 114 inside the large-diameter cylindrical portion 111. In addition, the rod 123 can further advance downward from the casing 110, namely, to a second switching valve 130 side through a through-hole of an annular bottom portion of the large-diameter cylindrical portion 111.

Figure 2B:
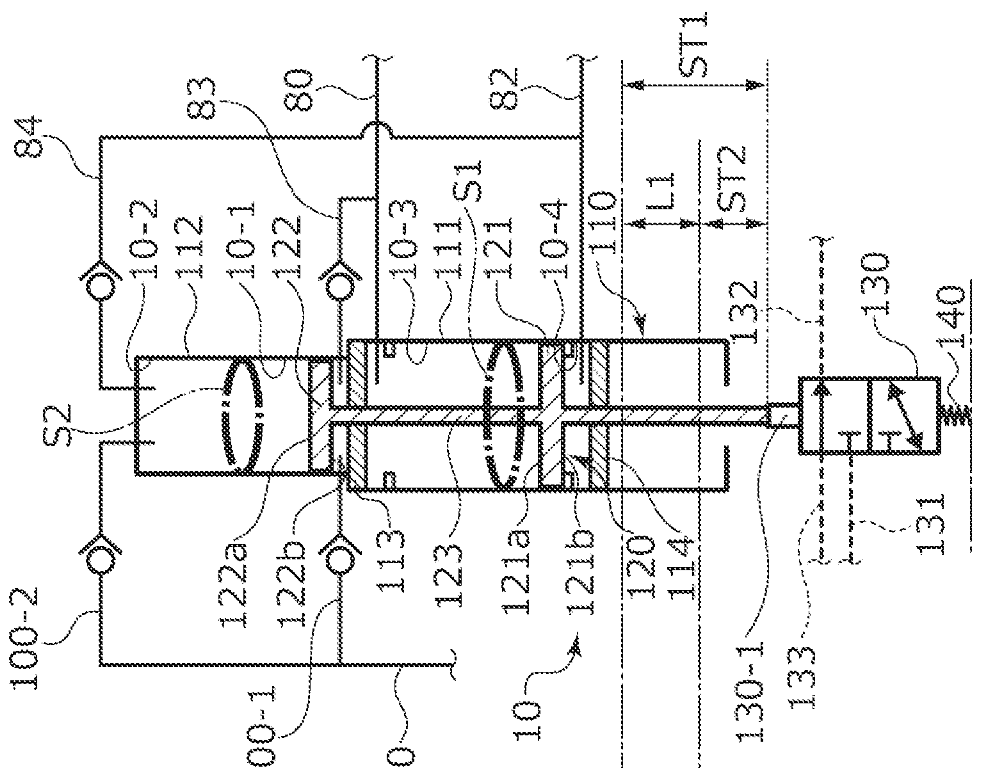
FIGS. 2(*a*) and 2(*b*) are enlarged schematic diagrams illustrating main parts of the pressure-increasing device in the first embodiment of the present invention.
Figure 2A:
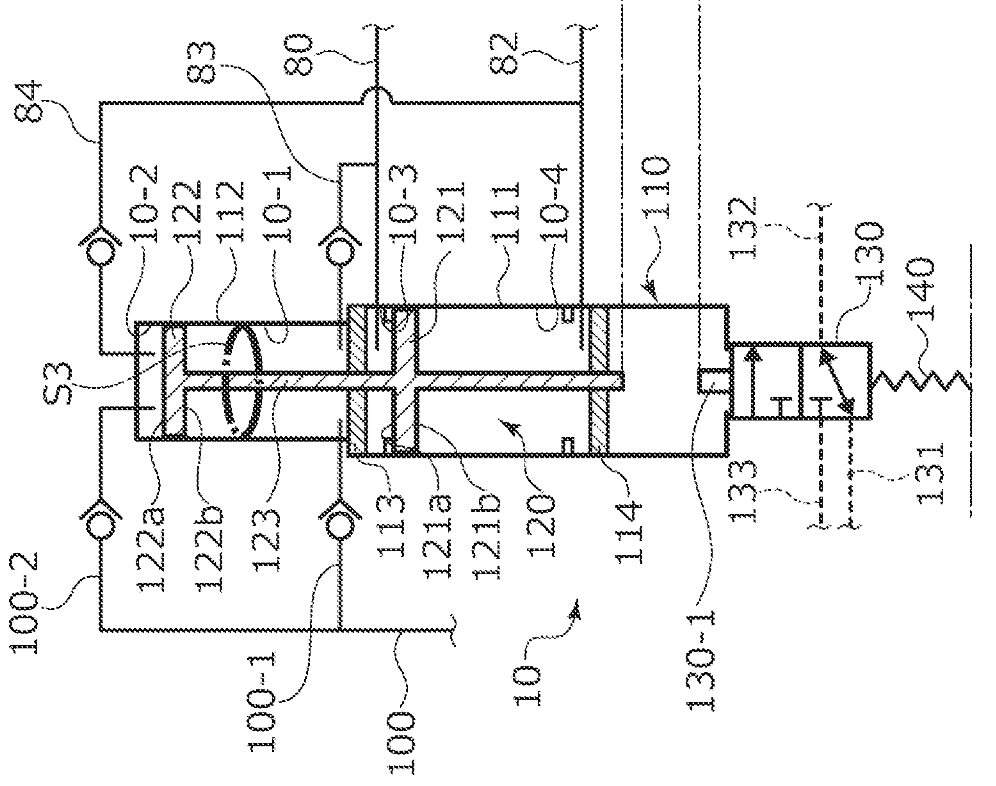

The piston 120 is configured to be reciprocatable between an end position illustrated in FIG. 2A and an end position illustrated in FIG. 2B by a stroke ST1. The end position illustrated in FIG. 2A is an end position on an upper axial side where an upper end surface 121*a* of the large-diameter portion 121 comes into contact with the spacer in the first back pressure chamber 10-3 on the upper axial side and movement of the large-diameter portion 121 in the same direction is restricted. The end position illustrated in FIG. 2B is an end position on a lower axial side where a lower end surface 121*b* of the large-diameter portion 121 comes into contact with the spacer in the second back pressure chamber 10-4 on the lower axial side and movement of the large-diameter portion 121 in the same direction is restricted.

Referring to FIG. 2B, an area S1 that is an effective pressure-receiving area of the piston 120 in the first back pressure chamber 10-3 is the same as the area S1 that is an effective pressure-receiving area of the piston 120 in the second back pressure chamber 10-4. The area S1 is an area of the annular upper end surface 121*a* of the large-diameter portion 121. In addition, the area S1 is an area of the annular lower end surface 121*b* of the large-diameter portion 121.

In addition, an area S2 (refer to FIG. 2B) that is an effective pressure-receiving area of the piston 120 in the second pressure-increasing chamber 10-2 is substantially the same as an area S3 (refer to FIG. 2A) that is an effective pressure-receiving area of the piston 120 in the first pressure-increasing chamber 10-1 ($S2 \approx S3$). The area S2 is an area of an upper end surface 122*a* of the small-diameter portion 122. The area S3 is an area of an annular lower end surface 122*b* of the small-diameter portion 122. Incidentally, a cross-sectional area of the rod 123 has been described as being sufficiently smaller than that of the small-diameter portion 122, but the cross-sectional area of the rod 123 may be taken into consideration.

Further, referring to FIGS. 2A and 2B, the area S1 is set to be larger than the areas S2 and S3 (i.e., $S1 > S2 \approx S3$).

The second switching valve 130 includes the return spring 140 as a return device at a lower end thereof. In addition, a rod 130-1 of the second switching valve 130 is disposed at an upper end of the second switching valve 130 and substantially the same axis as that of the rod 123 of the piston 120.

The return spring 140 is made of an elastic material having a constant spring constant k which is extendable and contractible in the axial direction, and is installed such that a base end portion (lower end portion in the drawings) of the return spring 140 is fixed. In addition, a free end portion (upper end portion in the drawings) of the return spring 140 is in contact with a lower end surface of the second switching valve 130 in a compressed state. The return spring 140 presses the second switching valve 130 upward in the axial direction by means of a return force generated according to a compression position of the return spring 140.

Accordingly, in a state where the piston 120 separates from the second switching valve 130 and moves upward in the axial direction (refer to FIG. 5A), and in a state where the piston 120 has reached the end position on the upper axial side (refer to FIG. 2A), the second switching valve 130 moves upward in the axial direction and returns to a return position where the second switching valve 130 is stopped, due to an elastic return force of the return spring 140.

Here, in a state where the second switching valve 130 has reached the return position and the piston 120 has reached the end position on the upper axial side, as illustrated in FIG. 2A, the upper end surface of the rod 130-1 of the second switching valve 130 and a lower end surface of the rod 123 are separated from each other by a predetermined dimension L1. At this time, the upper end surface of the rod 130-1 and the lower end surface of the rod 123 are most separated from each other.

In addition, as illustrated in FIG. 2A, the second switching valve 130 that has reached the return position connects a drain oil passage 131 and a pilot oil passage 132. At the same time, the second switching valve 130 disconnects the pilot oil passage 132 and a pilot oil passage 133. The drain oil passage 131 is connected to the tank T. The pilot oil passage 132 is connected to the port 8-1 of the first switching valve 8. The pilot oil passage 133 is branched and connected to the oil passage 70.

In addition, as illustrated in FIG. 2B, in a state where the piston 120 has reached the end position on the lower axial side, the second switching valve 130 is pressed downward in the axial direction against the elastic return force of the return spring 140 and is moved to an operation position by the rod 123 of the piston 120.

Namely, as illustrated in FIGS. 2A and 2B, the second switching valve 130 is configured to be reciprocatable between the return position on the upper axial side and the operation position on the lower axial side by a stroke ST2.

In addition, as illustrated in FIG. 2B, the second switching valve 130 that has reached the operation position connects the pilot oil passages 132 and 133. At the same time, the second switching valve 130 disconnects the drain oil passage 131 and the pilot oil passage 132.

As illustrated in FIG. 1, the adjustable slow return valve 9 formed of a variable throttle portion 90, a pilot oil passage 91, and a check valve 92 is provided in the pilot oil passage 132. The pilot oil passage 91 is connected to the pilot oil passage 132 across the variable throttle portion 90. The check valve 92 is provided in the middle of the pilot oil passage 91.

Next, a pressure-increasing cycle performed by the pressure-increasing device 10 will be described with reference to FIGS. 1 to 5. Incidentally, in this description, it is assumed that the increasing of pressure by the pressure-increasing device 10 is started from a state where the piston 120 has reached the end position on the upper axial side inside the casing 110.

In addition, a fluid pressure PH of the hydraulic oil delivered from the pilot circuit hydraulic pump 6 is 1 MPa (=10.2 $kg/cm^2$). A pressure Po of the oil stored in the tank T that is open to the outside is 0.1 Mpa (=1.02 $kg/cm^2$). Incidentally, each numerical value described above may be changed as appropriate.

Figure 3A:
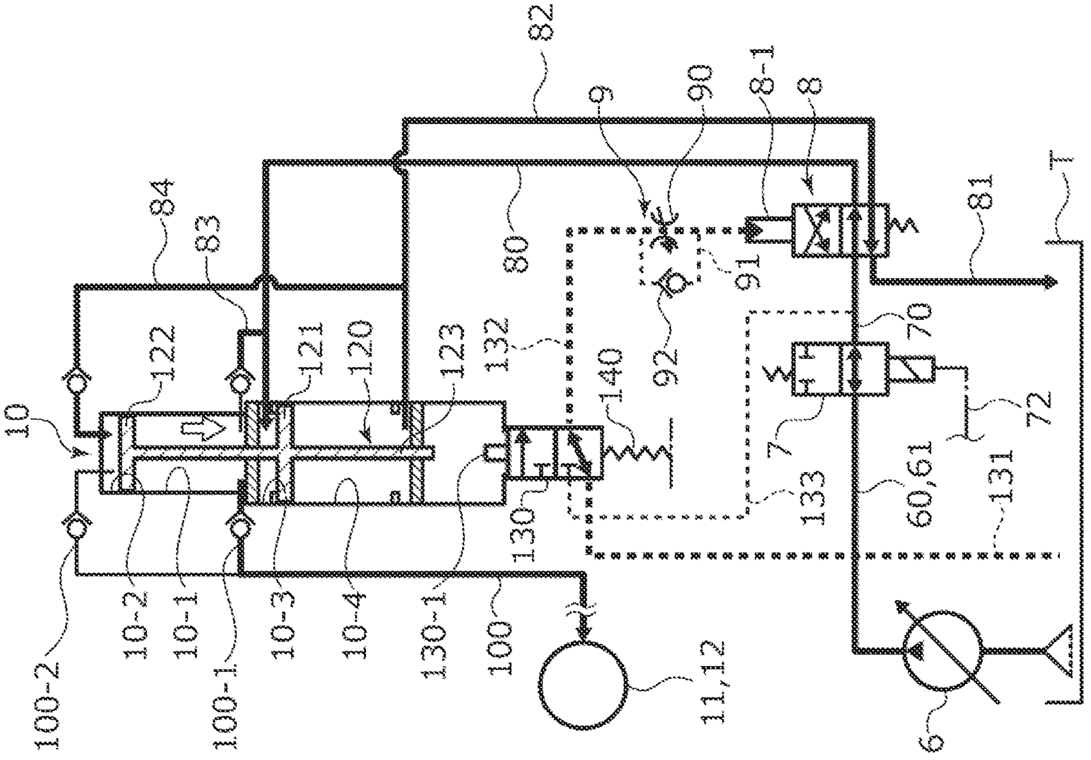
FIGS. 3(*a*) and 3(*b*) are schematic diagrams for describing a pressure-increasing cycle of a working fluid performed by the pressure-increasing device in the first embodiment of the present invention.

First, the switch 15 in an OFF state is set to an ON state. Accordingly, as illustrated in FIG. 3A, the electromagnetic switching valve 7 connects the oil passages 61 and 70. Then, some of the hydraulic oil delivered from the pilot circuit hydraulic pump 6 flows into the first back pressure chamber 10-3 of the pressure-increasing device 10 through the oil passages 60 and 61, the electromagnetic switching valve 7, the oil passage 70, the first switching valve 8, and the oil passage 80.

At this time, when the fluid pressure of oil in the first pressure-increasing chamber 10-1 is smaller than the fluid pressure PH of the hydraulic oil delivered from the pilot circuit hydraulic pump 6, a check valve in the oil passage 83 is opened. Accordingly, some of the hydraulic oil delivered from the pilot circuit hydraulic pump 6 flows into the first pressure-increasing chamber 10-1. Therefore, the fluid pressure of the oil in the first pressure-increasing chamber 10-1 immediately becomes substantially the same pressure as the fluid pressure $P_{H1}$. Then, the check valve in the oil passage 83 is closed.

A pressing force FH obtained by multiplying the fluid pressure PH of the hydraulic oil, which is delivered from the pilot circuit hydraulic pump 6 to flow into the first back pressure chamber 10-3, by the area S1 (refer to FIG. 2B) of the upper end surface 121*a* of the large-diameter portion 121 ($F_{H1} = P_{H1} \times S1$) acts on the large-diameter portion 121 of the piston 120. The pressing force $F_{H1}$ presses the piston 120 downward in the axial direction.

On the other hand, the second back pressure chamber 10-4 is connected to the tank T through the oil passage 82, the first switching valve 8, and the oil passage 81. For this reason, the oil is discharged from the second back pressure chamber 10-4 to the tank T, and the pressure in the second back pressure chamber 10-4 becomes a fluid pressure smaller than 1 Mpa.

In such a manner, the pressure in the first back pressure chamber 10-3 is larger than the pressure in the second back pressure chamber 10-4, so that a force $F_{M1}$ to move the piston 120 downward in the axial direction is generated. Then, as indicated by a white arrow in FIG. 3A, the piston 120 starts to move downward in the axial direction.

Accordingly, the pressure of the hydraulic oil in the first pressure-increasing chamber 10-1 is increased to a fluid pressure $P_{H2}$ calculated by dividing the force $F_{M1}$ to move the piston 120 downward in the axial direction by the area S3 (refer to FIG. 2A) of the lower end surface 122*b* of the small-diameter portion 122 of the piston 120 ($P_{H2}=F_{M1}\div S3$). Then, the hydraulic oil of the fluid pressure $P_{H2}$ that is increased in pressure as the piston 120 moves downward in the axial direction is sequentially delivered toward the oil passage 100.

On the other hand, as the piston 120 moves downward in the axial direction, the second pressure-increasing chamber 10-2 is relatively reduced in pressure with respect to the second back pressure chamber 10-4. Accordingly, a check valve of the oil passage 84 is opened. Then, as indicated by black arrows in FIGS. 3A, 3B, and 4A, some of the oil in the second back pressure chamber 10-4 flows into the second pressure-increasing chamber 10-2. In such a manner, the oil is stored in the second pressure-increasing chamber 10-2.

When the piston 120 starts to move downward in the axial direction and moves by the predetermined dimension L1, the lower end surface of the rod 123 comes into contact with the upper end surface of the rod 130-1 of the second switching valve 130.

Incidentally, the return force of the return spring 140 of the second switching valve 130 is significantly smaller than the force $F_{M1}$ with which the second switching valve 130 moves the piston 120 downward in the axial direction to the operation position. For this reason, a description of an influence of the return force on the force $F_{M1}$ will be omitted.

Figure 3B:
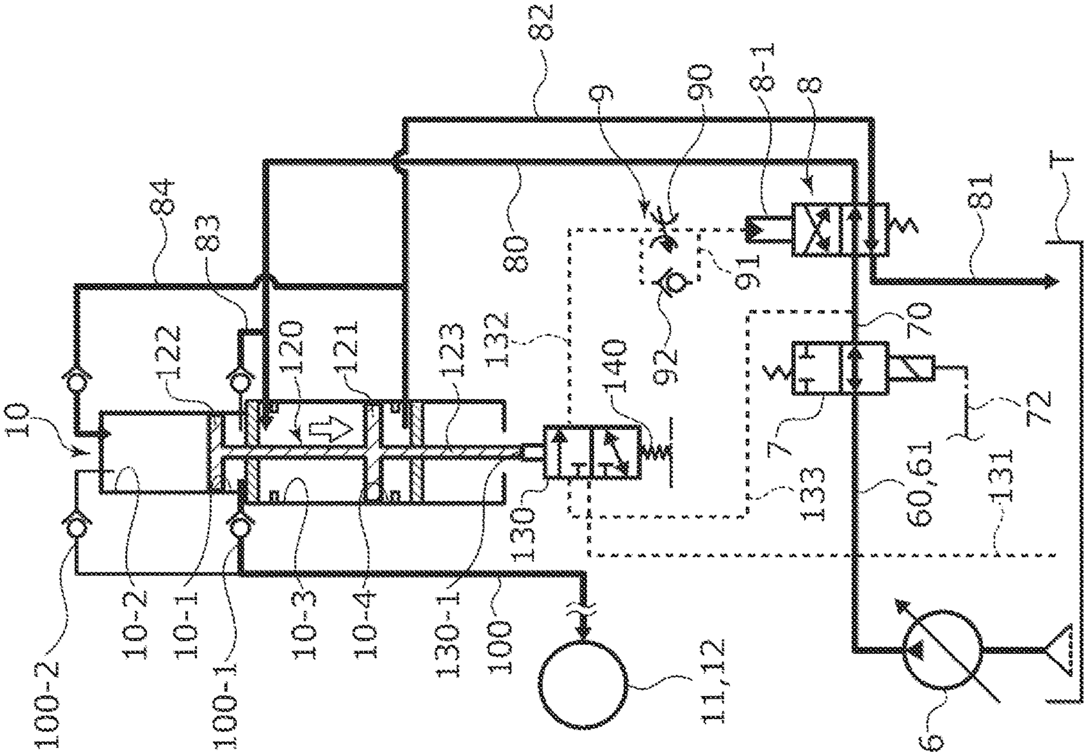

In addition, while the piston 120 moves from the end position on the upper axial side to the end position on the lower axial side, as illustrated in FIG. 3B, the second switching valve 130 disconnects both the oil passages 131 and 132 and the oil passages 132 and 133. Accordingly, the pressure acting on the port 8-1 of the first switching valve 8 is kept constant. For this reason, the pressure acting on the port 8-1 is prevented from fluctuating and causing accidental switching of the oil passages.

Figure 4B:
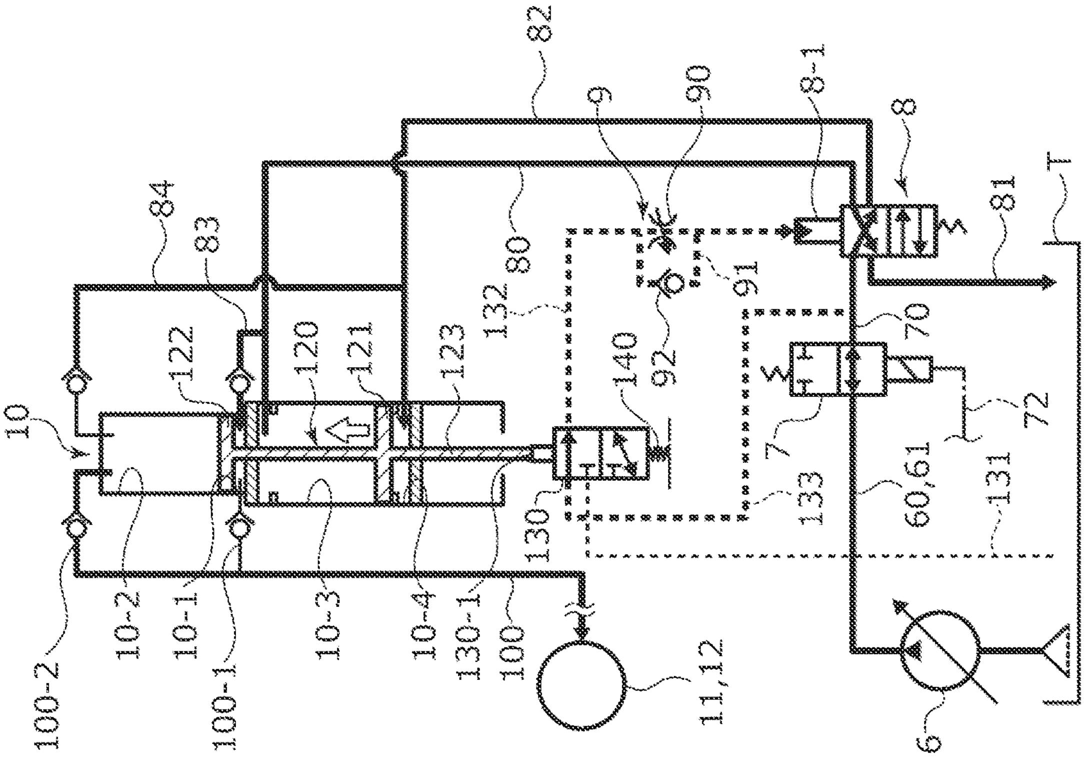
FIGS. 4(*a*) and 4(*b*) are schematic diagrams for describing the pressure-increasing cycle of the working fluid performed by the pressure-increasing device in the first embodiment of the present invention.
Figure 4A:
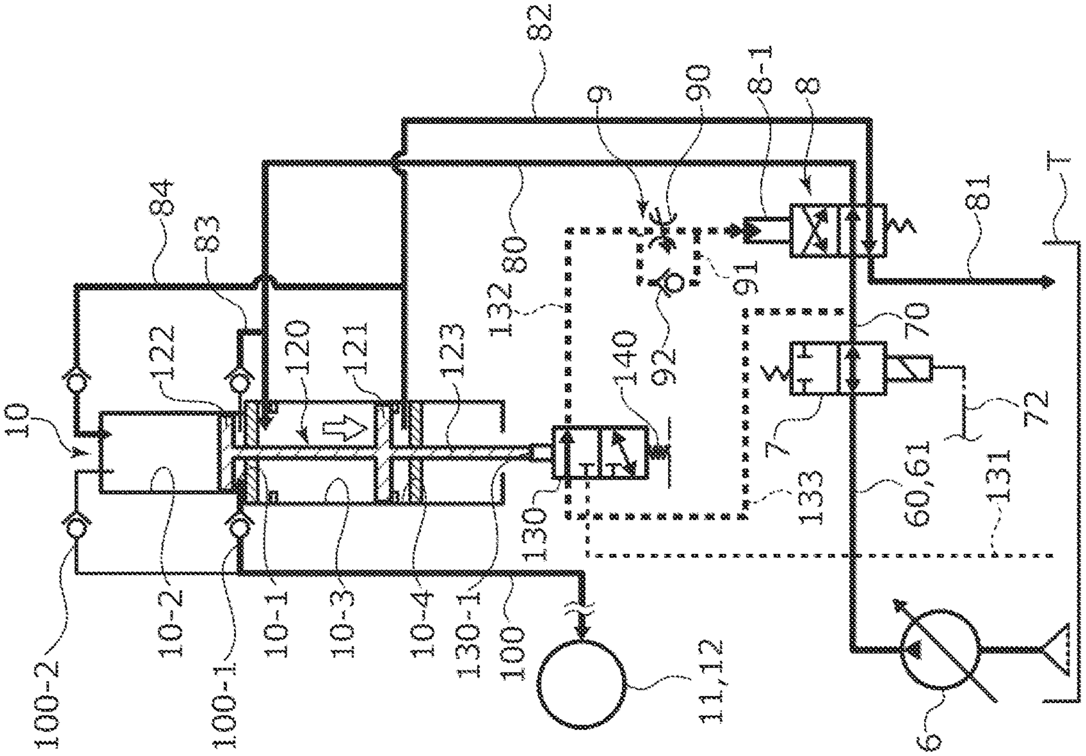

Thereafter, the piston 120 further moves downward in the axial direction, more specifically, moves by the predetermined dimension L1, and then further moves by the stroke ST2 until the second switching valve 130 reaches the operation position from the return position, so that the piston 120 reaches the end position on the lower axial side as illustrated in FIG. 4A. Accordingly, the second switching valve 130 connects the oil passages 132 and 133.

Then, as indicated by a dotted arrow in FIG. 4A, the hydraulic oil flows into the pilot oil passage 132 from the pilot circuit hydraulic pump 6 through the pilot oil passage 133.

In addition, the adjustable slow return valve 9 is provided in the pilot oil passage 132. The hydraulic oil that has passed through the pilot oil passage 91 and through the check valve 92 that form the adjustable slow return valve 9 acts on the port 8-1.

When the pressure acting on the port 8-1 is the predetermined value or more, as illustrated in FIG. 4B, the first switching valve 8 connects the oil passages 70 and 82. Accordingly, some of the hydraulic oil delivered from the pilot circuit hydraulic pump 6 flows into the second back pressure chamber 10-4 of the pressure-increasing device 10 through the oil passages 60 and 61, the electromagnetic switching valve 7, the oil passage 70, the first switching valve 8, and the oil passage 82.

At this time, when the fluid pressure of the oil in the second pressure-increasing chamber 10-2 is smaller than the fluid pressure PH of the hydraulic oil delivered from the pilot circuit hydraulic pump 6, the check valve of the oil passage 84 is opened. Accordingly, some of the hydraulic oil delivered from the pilot circuit hydraulic pump 6 flows into the second pressure-increasing chamber 10-2. Therefore, the fluid pressure in the second pressure-increasing chamber 10-2 immediately becomes substantially the same pressure as the fluid pressure $P_{H1}$. Then, the check valve in the oil passage 84 is closed.

A pressing force $F_{H3}$ obtained by multiplying the fluid pressure $P_{H1}$ of the hydraulic oil, which is delivered from the pilot circuit hydraulic pump 6 to flow into the second back pressure chamber 10-4, by the area S1 of the lower end surface 121*b* of the large-diameter portion 121 ($FH3=P_{H1}\times S1$) acts on the large-diameter portion 121 of the piston 120. The pressing force $F_{H3}$ presses the piston 120 upward in the axial direction.

On the other hand, the first back pressure chamber 10-3 is connected to the tank T through the oil passage 80, the first switching valve 8, and the oil passage 81. For this reason, the oil is discharged from the first back pressure chamber 10-3 to the tank T, and the pressure in the first back pressure chamber 10-3 becomes a fluid pressure smaller than 1 Mpa.

In such a manner, the pressure in the second back pressure chamber 10-4 is larger than the pressure in the first back pressure chamber 10-3, so that a force $F_{M2}$ to move the piston 120 upward in the axial direction is generated. Then, as indicated by a white arrow in FIG. 4B, the piston 120 starts to move upward in the axial direction.

Accordingly, the pressure of the hydraulic oil in the second pressure-increasing chamber 10-2 is increased to a fluid pressure $P_{H3}$ calculated by dividing the force $F_{M2}$ to move the piston 120 upward in the axial direction by the area S2 (refer to FIG. 2B) of the upper end surface 122*a* of the small-diameter portion 122 of the piston 120 ($P_{H3}=F_{M2}\div S2$). Then, the hydraulic oil of the fluid pressure $P_{H3}$ that is increased in pressure as the piston 120 moves upward in the axial direction is sequentially delivered toward the oil passage 100.

On the other hand, as the piston 120 moves upward in the axial direction, the first pressure-increasing chamber 10-1 is relatively reduced in pressure with respect to the first back pressure chamber 10-3. Accordingly, the check valve of the oil passage 83 is opened. Then, as indicated by black arrows in FIGS. 4B, 5A and 5B, some of the oil in the first back pressure chamber 10-3 flows into the first pressure-increasing chamber 10-1. In such a manner, the oil is stored in the first pressure-increasing chamber 10-1.

In addition, while the piston 120 moves from the end position on the lower axial side to the end position on the upper axial side, referring to FIG. 3B, the second switching valve 130 disconnects both the oil passages 131 and 132 and the oil passages 132 and 133. Accordingly, the pressure acting on the port 8-1 of the first switching valve 8 is kept constant. For this reason, the pressure acting on the port 8-1 is prevented from fluctuating and causing accidental switching of the oil passages.

Figure 5B:
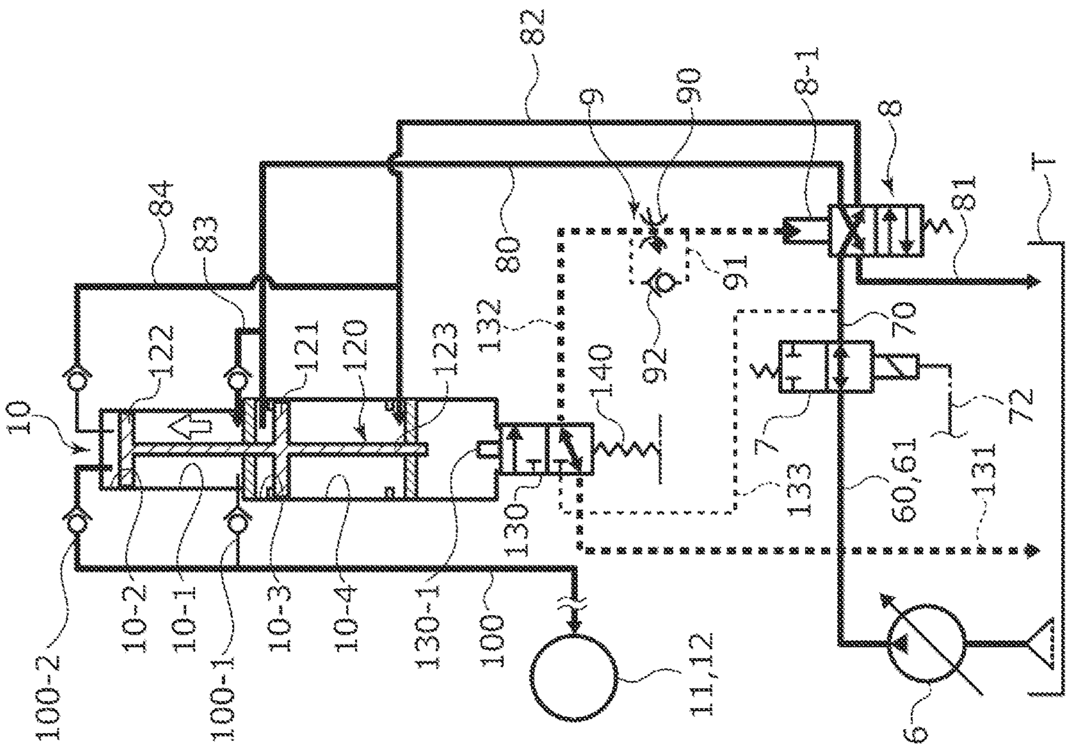
FIGS. 5(*a*) and 5(*b*) are schematic diagrams for describing the pressure-increasing cycle of the working fluid performed by the pressure-increasing device in the first embodiment of the present invention.
Figure 5A:
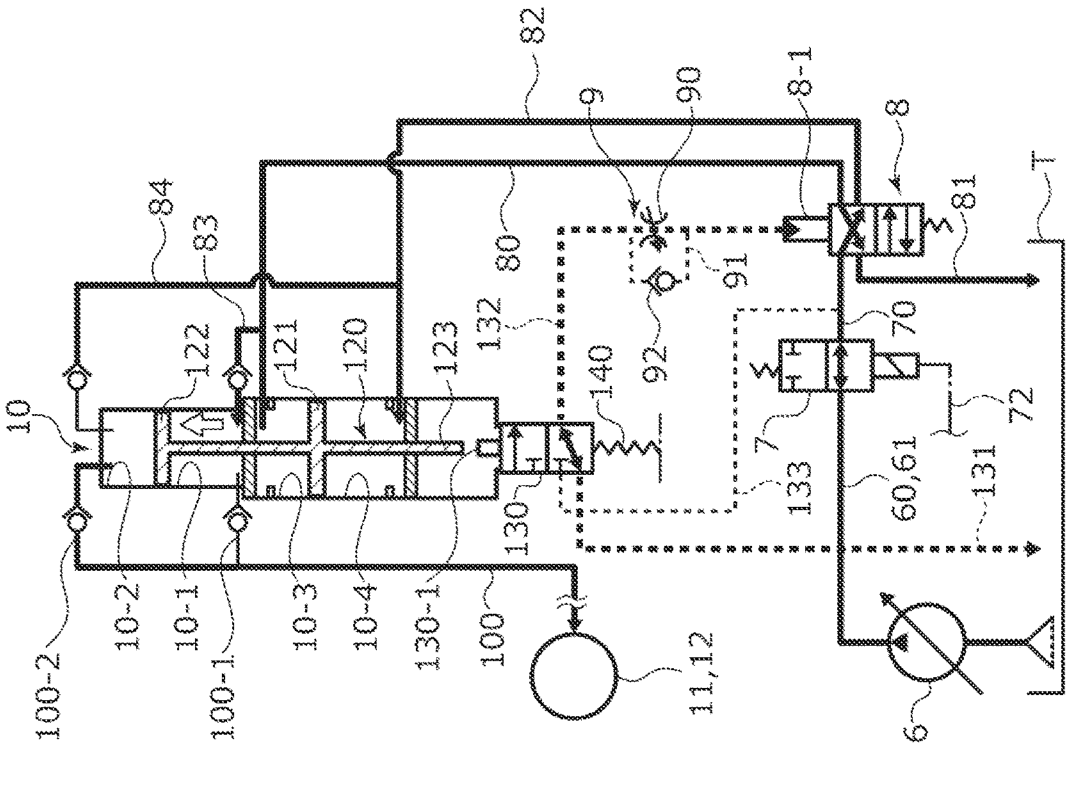

When the piston 120 starts to move upward in the axial direction and moves by the stroke ST2 or more, as illustrated in FIG. 5A, the lower end surface of the rod 123 separates from the upper end surface of the rod 130-1 of the second switching valve 130.

Incidentally, in the present embodiment, the return force of the return spring 140 when the second switching valve 130 has reached the operation position is such that the return spring 140 is movable by a distance that the piston 120 has moved upward in the axial direction, to follow the second switching valve 130. Namely, the return force makes almost no contribution to the force $F_{M2}$ to move the piston 120 upward in the axial direction.

As illustrated in FIG. 5A, even in a state where the piston 120 has not reached the end position on the upper axial side, the second switching valve 130 that has reached the return position connects the oil passages 132 and 131.

Here, the variable throttle portion 90 that can be adjusted in opening degree can change the time taken until pressure, which acts on the port 8-1 of the first switching valve 8 according to an opening degree, is less than a predetermined value.

Namely, as illustrated in FIG. 5B, the variable throttle portion 90 can ensure the longer time taken until the first switching valve 8 is switched, than the time taken until the piston 120 reaches the end position on the upper axial side. Accordingly, the pressure-increasing device 10 can stably reciprocate the piston 120 by the maximum stroke ST1.

In addition, even after the piston 120 has reached the end position on the upper axial side, the opening degree of the variable throttle portion 90 is adjusted to ensure the time taken until the pressure acting on the port 8-1 is less than the predetermined value, so that the variable throttle portion 90 can adjust the time taken until the piston 120 starts to move from the end position on the upper axial side to the end position on the lower axial side.

Then, when the pressure acting on the port 8-1 is less than the predetermined value, as illustrated in FIG. 3A, the first switching valve 8 allows communication between the oil passages 70 and 80.

Hereinafter, when the switch 15 is in an ON state, switching between a state where the hydraulic oil delivered from the pilot circuit hydraulic pump 6 flows into the first back pressure chamber 10-3 and a state where the hydraulic oil flows into the second back pressure chamber 10-4 can be performed by the first switching valve 8 and the second switching valve 130. Accordingly, the fluid circuit can repeatedly perform the above-described cycle by reciprocating the piston 120. Namely, the fluid circuit can continuously drive the pressure-increasing device 10 using the fluid pressure from the pilot circuit hydraulic pump 6.

As described above, the fluid circuit of the present embodiment can continuously reciprocate the piston 120 via cooperation between the first switching valve 8 and the second switching valve 130 that mechanically operate. Namely, a high fluid pressure can be continuously generated without performing electric control. Accordingly, electric control as in the related art is not required, so that the configuration of the fluid circuit can be simplified.

In addition, for example, in a case where the piston and the second switching valve are configured to integrally operate from the end position on an upper axial end side to the end position on a lower axial end side, the piston can only stroke by a distance that the second switching valve moves from the return position to the operation position.

In contrast to this configuration, as in the present embodiment, in a case where the piston 120 and the second switching valve 130 are movable independently of each other, the stroke ST1 of the piston 120 is obtained by adding the predetermined dimension L1 that the piston 120 moves independently of the second switching valve 130, to the stroke ST2 that the second switching valve 130 moves from the return position to the operation position. For this reason, the stroke ST1 of the piston 120 can be increased.

In other words, the piston 120 can be separated from the second switching valve 130 that has reached the return position, by the predetermined dimension L1. For this reason, at least the piston 120 can be stroked by the predetermined dimension L1.

Accordingly, it is possible to shorten the stroke of the second switching valve 130 while ensuring the stroke of the piston 120. Namely, the small second switching valve 130 can be employed.

In addition, when the piston 120 moves downward in the axial direction, the pressure-increasing device 10 delivers the hydraulic oil, which is increased in pressure, to the first pressure-increasing chamber 10-1. In addition, when the piston 120 moves upward in the axial direction, the pressure-increasing device 10 delivers the hydraulic oil, which is increased in pressure, to the second pressure-increasing chamber 10-2. Namely, the pressure-increasing device 10 is a so-called double acting type.

In a double acting type pressure-increasing device, for example, in a case where the piston and the second switching valve are configured to integrally operate from the end position on the upper axial end side to the end position on the lower axial end side, the second switching valve has to reach the operation position at the time that the piston reaches the end position on the lower axial end side, so that high accuracy is required in designing, manufacturing, and assembling members.

In contrast to this configuration, as in the present embodiment, in the pressure-increasing device 10 in which the piston 120 and the second switching valve 130 are movable independently of each other, the only thing to do is to adjust the stroke ST1 of the piston 120 with respect to the stroke ST2 of the second switching valve 130. For this reason, it is possible to provide the double acting type pressure-increasing device 10 that can be simply configured and that has high pressure-increasing efficiency.

In addition, the piston 120 includes the rod 123 extending to the second switching valve 130 side. For this reason, the configuration for transmitting a movement of the piston 120 to the second switching valve 130 can be simplified.

In addition, since the return spring 140 is employed as a return device of the second switching valve 130, for example, compared to a configuration in which a hydraulic piston, a solenoid, or the like is employed as a return device, the second switching valve 130 can be simply configured.

Further, the spring constant k of the return spring 140 may be a spring constant sufficient to cause the second switching valve 130 to reach the return position. Therefore, a spring of relatively small size can be employed, for example, compared to a spring with a spring constant that needs to move the piston to the return position, together with the second switching valve. For this reason, the second switching valve 130 can be reduced in size.

In addition, the hydraulic oil that is increased in pressure by the pressure-increasing device 10 is delivered by the downward axial movement of the piston 120, and is accumulated in the accumulators 11 and 12. For this reason, the occurrence of a pulsation caused by the reciprocation of the piston 120 is prevented. Accordingly, a substantially constant amount of the hydraulic oil can be delivered to the side of the accumulators 11 and 12.

In addition, the oil passage 107 including the check valve that is provided between the accumulators 11 and 12 and a main circuit can be divided into a section from the check valve to the main circuit side and a section from the check valve to the side of the accumulators 11 and 12, namely, an upstream side. Accordingly, even in a case where the main circuit side is a high-pressure specification, the fluid of a high pressure can be delivered without using an unnecessary high-pressure specification by setting a configuration on the side of the accumulators 11 and 12 to a minimum-pressure specification required for recovery of a high fluid pressure to a delivery destination.

Second Embodiment

A fluid circuit according to a second embodiment of the present invention will be described with reference to FIG. 6. Incidentally, descriptions of the same duplicate configurations as the configurations of the first embodiment will be omitted.

As illustrated in FIG. 6, in a pressure-increasing device 210 of the fluid circuit of the second embodiment, a piston 320 is disposed inside a casing 310 so as to be reciprocatable in the axial direction. The casing 310 is formed in a T-shaped stepped cylindrical shape when viewed from the front. The piston 320 is formed in a T-shaped stepped columnar shape when viewed from the front. Accordingly, a space inside the casing 310 is partitioned into a back pressure chamber 210-1 as a first pressure-receiving chamber and a pressure-increasing chamber 210-2 as a second pressure-receiving chamber.

Figure 6B:
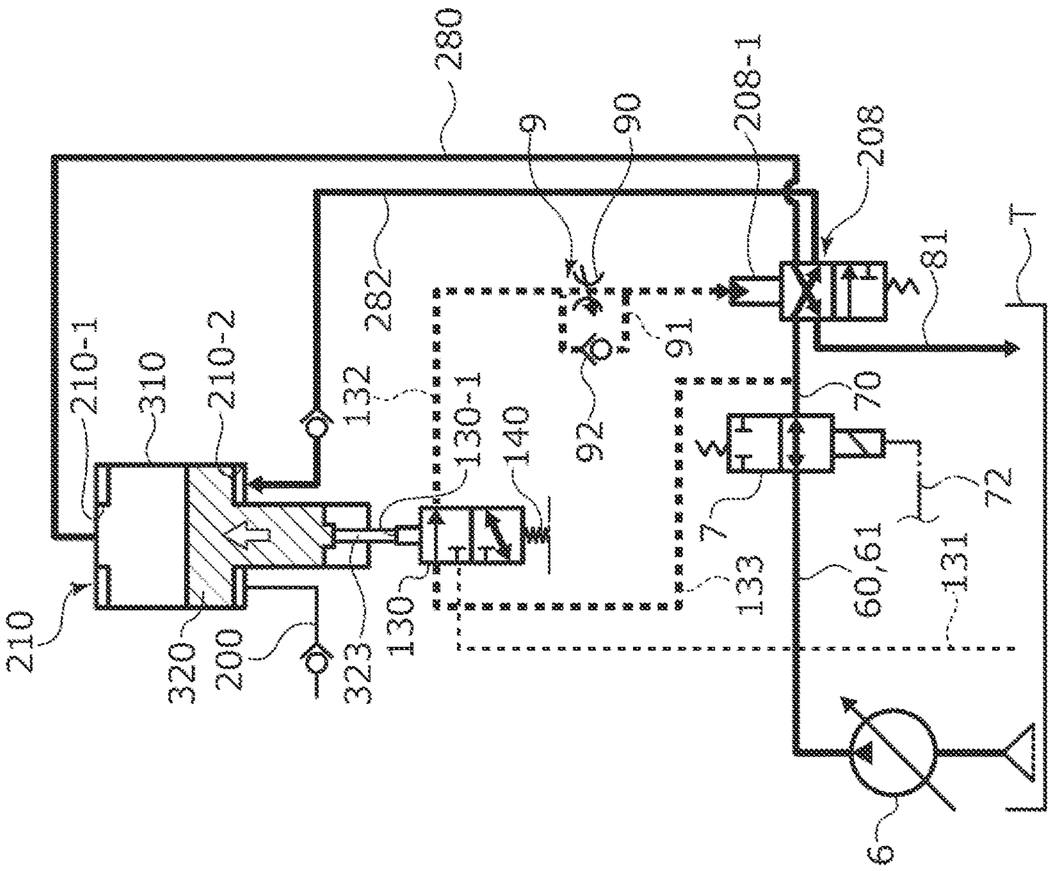
FIGS. 6(*a*) and 6(*b*) are schematic diagrams illustrating a fluid circuit including a pressure-increasing device, according to a second embodiment of the present invention.
Figure 6A:
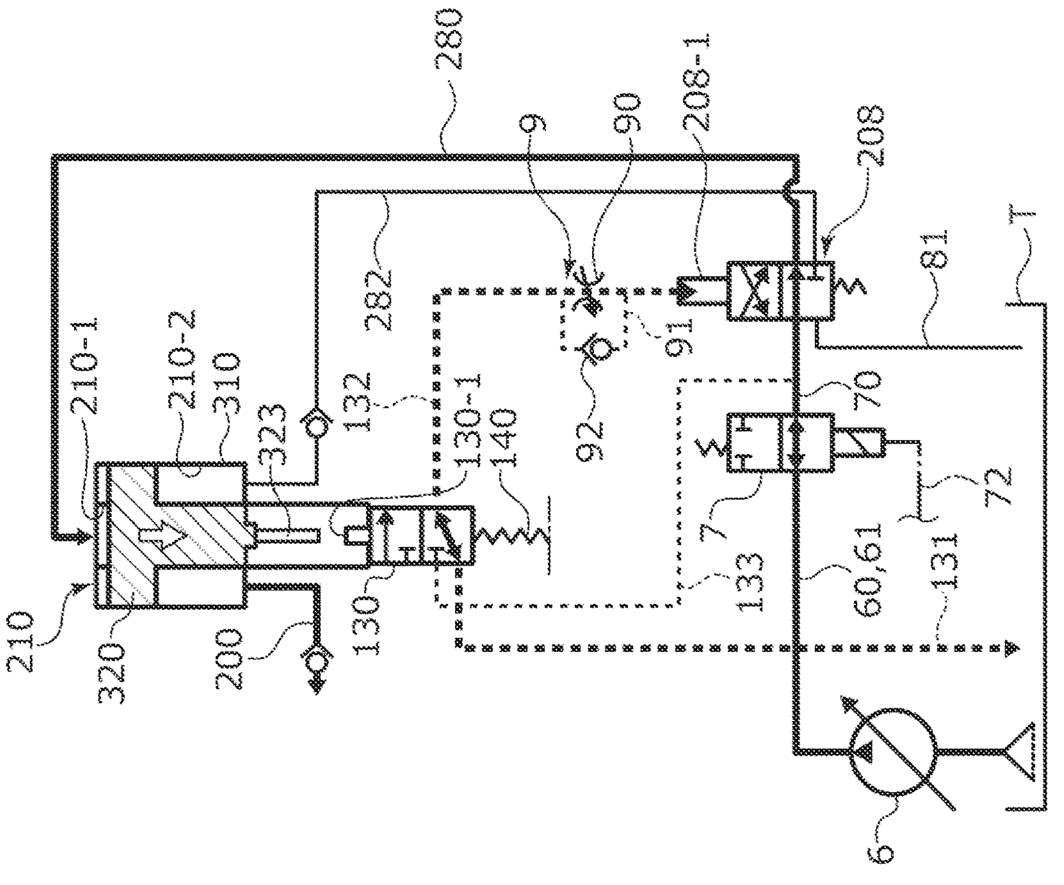

When the pressure acting on a port 208-1 is less than a predetermined value, as illustrated in FIG. 6A, a first switching valve 208 connects the oil passage 70 and an oil passage 280. At the same time, the first switching valve 208 disconnects the oil passage 81 and an oil passage 282. The oil passage 280 is connected to the back pressure chamber 210-1. The oil passage 282 is connected to the pressure-increasing chamber 210-2.

In addition, when the pressure acting on the port 208-1 is the predetermined value or more, as illustrated in FIG. 6B, the first switching valve 208 connects the oil passage 70 and the oil passage 282. At the same time, the first switching valve 208 connects the oil passage 81 and the oil passage 280.

As illustrated in FIG. 6A, when the hydraulic oil flows into the back pressure chamber 210-1 in a state where the piston 320 has reached the end position on the upper axial side, the piston 320 moves downward in the axial direction. Accordingly, the hydraulic oil that is increased in pressure in the pressure-increasing chamber 210-2 is delivered to a flow passage 200 including a check valve.

In addition, as illustrated in FIG. 6B, when a rod 323 of the piston 320 comes into contact with the rod 130-1 of the second switching valve 130, and then the piston 320 further moves to the end position on the lower axial side, oil passages to be connected by the second switching valve 130 are switched. Then, when oil passages to be connected by the first switching valve 208 are switched, the hydraulic oil in the back pressure chamber 210-1 is discharged to the tank T, and the fluid pressure in the back pressure chamber 210-1 decreases. On the other hand, the hydraulic oil delivered from the pilot circuit hydraulic pump 6 flows into the pressure-increasing chamber 210-2.

Accordingly, a ratio between a fluid pressure in the back pressure chamber 210-1 and a fluid pressure in the pressure-increasing chamber 210-2 is larger than a ratio between an effective pressure-receiving area of the piston 320 on a back pressure chamber 210-1 side and an effective pressure-receiving area thereof on a pressure-increasing chamber 210-2 side. For this reason, the piston 320 can be moved upward in the axial direction.

In such a manner, even in the so-called single acting type pressure-increasing device 210 that delivers the hydraulic oil which is increased in pressure only when the piston 320 moves downward in the axial direction, the pressure-increasing device 210 can be mechanically, continuously driven using the fluid pressure from the pilot circuit hydraulic pump 6.

In addition, the piston 320 and the second switching valve 130 move independently of each other. For this reason, it is possible to provide the single acting type pressure-increasing device 210 that can be simply configured and that has high pressure-increasing efficiency.

The embodiments of the present invention have been described above with reference to the drawings; however, the specific configurations are not limited to the embodiments, and the present invention also includes changes or additions that are made without departing from the scope of the present invention.

For example, in the first and second embodiments, the configuration has been described in which the working fluid is oil; however, the present invention is not limited to the configuration, and the working fluid may be a fluid or may be changed as appropriate.

In addition, in the first and second embodiments, the configuration has been described in which two accumulators are disposed on a downstream side of the pressure-increasing device; however, the present invention is not limited to the configuration, and the number of the accumulators may be one or may be three or more.

In addition, in the first and second embodiments, the configuration has been described in which the return device is a return spring; however, the present invention is not limited to the configuration, and the return device may be changed to various cylinders, solenoids, and the like as appropriate. In addition, the return device may be, for example, a magnet provided at a tip of the rod of the piston, and the second switching valve may be moved from the operation position to the return position and may be kept at the return position by being driven via the magnetization of the rod of the second switching valve to the magnet, and by separately providing holding means for holding a state where the second switching valve has reached the return position, via the engagement of an engageable and disengageable stopper with the second switching valve.

In addition, in the first and second embodiments, the configuration has been described in which the throttle portion is an adjustable slow return valve; however, the present invention is not limited to the configuration, and the throttle portion may be a slow return valve formed of a non-variable throttle valve and a check valve or may be formed of only a variable throttle portion, or may be changed as appropriate.

In addition, in the first and second embodiments, the configuration has been described in which after the adjustable slow return valve causes the piston to reach the end position on the upper axial side, the first switching valve is switched; however, the present invention is not limited to the configuration, and the first switching valve may be adjusted not to reach the return position until the return device causes the piston to reach the end position on the upper axial side, and when the first switching valve reaches the return position, the pressure applied to the port of the first switching valve may be released to switch the first switching valve.

In addition, in the first and second embodiments, the fluid supply device has been described as being the pilot circuit hydraulic pump; however, the present invention is not limited to the configuration, and the fluid supply device may be a main circuit hydraulic pump, an actuator, an accumulator, or the like, or may be changed as appropriate.

In addition, in the first and second embodiments, the configuration has been described in which the hydraulic oil delivered from the pressure-increasing device is delivered to the accumulator; however, the present invention is not limited to the configuration, and the hydraulic oil may be delivered to the actuator.

In addition, in the first and second embodiments, the configuration has been described in which the rod of the piston presses the rod of the second switching valve to perform switching between flow passages; however, the present invention is not limited to the configuration, and the configuration may be such that a bottom surface of the piston directly presses the rod of the second switching valve to perform switching between flow passages, or may be changed as appropriate.

In addition, the shapes of the casing and the piston are not limited to those described in the first and second embodiments, and as long as a difference between the effective pressure-receiving areas is provided, the shapes of the casing and the piston may be changed as appropriate.

In addition, in the first and second embodiments, the return spring side and the opposite side have been described as the one axial side and the other axial side, respectively; however, the present invention is not limited to the configuration, and the return spring side and the opposite side may be the other axial side and the one axial side, respectively.

REFERENCE SIGNS LIST

1 Drive mechanism
6 Pilot circuit hydraulic pump (fluid supply device)
8 First switching valve
9 Adjustable slow return valve (throttle portion)
10 Pressure-increasing device
10-1 First pressure-increasing chamber
10-2 Second pressure-increasing chamber
10-3 First back pressure chamber (first pressure-receiving chamber)
10-4 Second back pressure chamber (second pressure-receiving chamber)
80 Oil passage (flow passage that allows communication between first pressure-receiving chamber and fluid supply device side)
82 Oil passage (flow passage that allows communication between second pressure-receiving chamber and fluid supply device side)
110 Casing (cylinder)
120 Piston
123 Rod
130 Second switching valve
132 Pilot oil passage (flow passage between first switching valve and second switching valve)
140 Return spring
208 First switching valve
210 Pressure-increasing device
210-1 Back pressure chamber (first pressure-receiving chamber)
210-2 Pressure-increasing chamber (second pressure-receiving chamber)
280 Oil passage (flow passage that allows communication between first pressure-receiving chamber and fluid supply device side)
282 Oil passage (flow passage that allows communication between second pressure-receiving chamber and fluid supply device side)
310 Casing (cylinder)
320 Piston
323 Rod
L1 Predetermined dimension
ST1 Stroke of piston
ST2 Stroke of second switching valve

The invention claimed is:

1. A fluid circuit, comprising:

a pump configured to deliver a working fluid; and a pressure-increasing device configured to increase a pressure of the working fluid, wherein the pressure-increasing device includes a cylinder and a piston provided inside the cylinder configured to be reciprocatable in an axial direction, and to deliver the working fluid that is increased in pressure, from the cylinder by pressing the piston inside the cylinder with the working fluid delivered from the pump, the cylinder includes a first pressure-receiving chamber configured to apply the working fluid delivered from the pump, to the piston toward a first axial side, and a second pressure-receiving chamber configured to apply the working fluid delivered from the pump, to the piston toward a second axial side opposed to the first axial side, a first switching valve configured to switch between a first flow passage which allows communication between the first pressure-receiving chamber and a side of the pump and a flow passage which allows communication between the second pressure-receiving chamber and on the side of the pump, according to a change in a fluid pressure to be applied, and a second switching valve configured to switch to a flow passage which applies the fluid pressure to the first switching valve, the second switching valve includes a return device configured to reciprocate between an operation position to which the second switching valve is moved by a stroke of the piston and a return position to which the second switching valve is moved by the return device, the piston and the second switching valve are movable independently of each other, the cylinder is provided with a first pressure-increasing chamber configured to communicate with the first flow passage and a second pressure-increasing chamber configured to communicate with the second flow passage; and the fluid circuit further comprises a first check valve disposed between the first flow passage and the first pressure-increasing chamber and configured to allow only the working fluid to flow from the first flow passage to the first pressure-increasing chamber, and a second check valve disposed between the second flow passage and the second pressure-increasing chamber and configured to allow only the working fluid to flow from the second flow passage to the second pressure-increasing chamber.

2. The fluid circuit according to claim 1, wherein the piston is strokable in a state where the piston is separated from the second switching valve by a predetermined dimension, the second switching valve being located at the return position.

3. The fluid circuit according to claim 1, wherein the second pressure-receiving chamber is a chamber that is increased in pressure when the working fluid is delivered from the pump to the first pressure-receiving chamber.

4. The fluid circuit according to claim 1, wherein the piston includes a rod that is separable from the second switching valve.

5. The fluid circuit according to claim 1, wherein a throttle portion that restricts a flow of the working fluid from the first switching valve to the second switching valve is provided in a flow passage between the first switching valve and the second switching valve.

6. The fluid circuit according to claim 1, wherein the return device is a return spring.

7. The fluid circuit according to claim 2, wherein the second pressure-receiving chamber is a chamber that is increased in pressure when the working fluid is delivered from the pump to the first pressure-receiving chamber.

8. The fluid circuit according to claim 2, wherein the piston includes a rod that is separable from the second switching valve.

9. The fluid circuit according to claim 2, wherein a throttle portion that restricts a flow of the working fluid from the first switching valve to the second switching valve is provided in a flow passage between the first switching valve and the second switching valve.

10. The fluid circuit according to claim 2, wherein the return device is a return spring.

11. The fluid circuit according to claim 3, wherein the piston includes a rod that is separable from the second switching valve.

12. The fluid circuit according to claim 3, wherein a throttle portion that restricts a flow of the working fluid from the first switching valve to the second switching valve is provided in a flow passage between the first switching valve and the second switching valve.

13. The fluid circuit according to claim 3, wherein the return device is a return spring.

14. The fluid circuit according to claim 4, wherein a throttle portion that restricts a flow of the working fluid from the first switching valve to the second switching valve is provided in a flow passage between the first switching valve and the second switching valve.

15. The fluid circuit according to claim 4, wherein the return device is a return spring.

* * * * *